Oct. 10, 1950 F. J. JOHNSON 2,525,299
GUIDE STRUCTURE FOR FLUSH VALVE STEMS
Filed Nov. 27, 1945

Inventor
F. J. JOHNSON
By Ralph J. Bassett
Attorney

Patented Oct. 10, 1950

2,525,299

UNITED STATES PATENT OFFICE 2,525,299

GUIDE STRUCTURE FOR FLUSH VALVE STEMS

Frank J. Johnson, Chester, Pa.

Application November 27, 1945, Serial No. 631,037

1 Claim. (Cl. 4—57)

This invention relates to improvements in a guide structure particularly adaptable for use in centering the ball stem in conventional flush tanks.

One of the objects of this invention is to provide a structure which can be quickly and accurately adjusted without special tools or equipment to position the flush ball with respect to its seat.

A further object of this invention is to provide means whereby the ball guide has at all times a desirable freedom of motion essential under certain circumstances, which freedom of motion is not available in assemblies with fixed rod guides.

Other objects reside in the novel and inexpensive construction and arrangement of parts permittting removal, replacement and adjustment without the use of a tool within the restricted area of a flush tank and the provision of a construction involving a minimum number of parts each designed to limit the possibility of binding of the elements or wear of the relatively movable parts.

More specifically the invention comprehends a supporting unit which combines an attaching ring or collar and a threaded arm, the latter being formed with a longitudinal slot and cooperating with an adjusting nut having a guide passage for the movement and control of the ball stem to insure the proper arrangement and operation of the latter.

Reference will be had to the accompanying drawings forming a part of this specification and wherein like characters of reference designate corresponding parts throughout the several views, in which.

Figure 1:
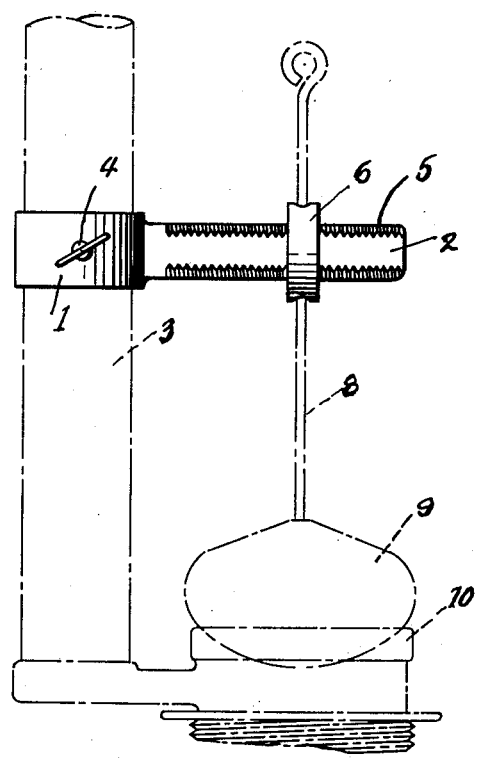
Figure 1 is a side elevation showing the parts assembled with the flush ball seated.
Figure 2:
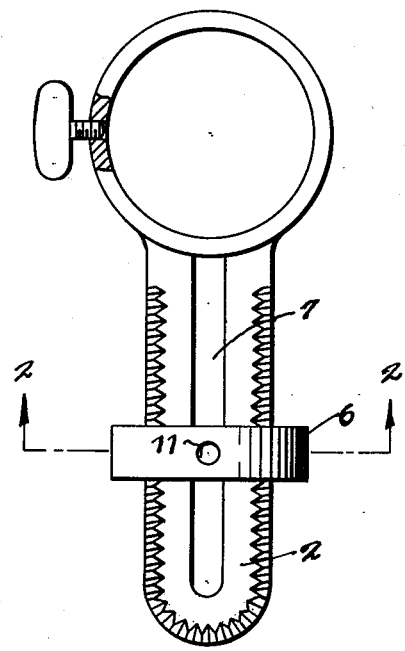
Fig. 2 is a top plan view of the invention.

It is preferable that the supporting collar indicated by reference character 1 and the threaded arm 2 be formed integral as shown, although any substitute for this unit assembly may be provided to reduce the cost of manufacture if the same desirable results are obtained. The units may be made with the supporting collar 1 of various sizes to fit different diameter overflow tube 3, or this collar may be made in the form of an adjustable split clamp, and in the latter event a modified fastening device would be used in lieu of the thumb screw 4.

Figure 3:
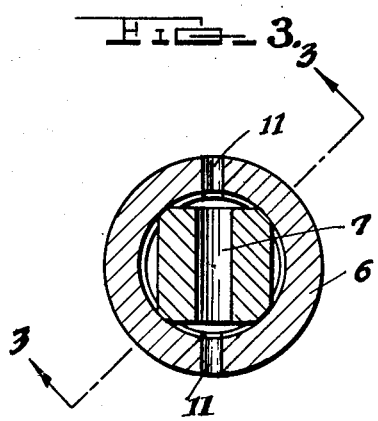
Fig. 3 is a section on line 2—2 of Fig. 2.
Figure 4:
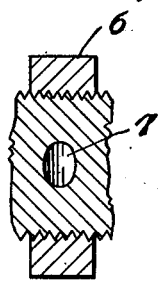
Fig. 4 is a section on line 3—3 of Fig. 3.

The arm 2 is square in cross section as best shown in Figure 3, with its four corners slightly cut away to provide an area sufficient to permit formation of the running threads 5. The threads 5 are for threaded engagement with the cylindrical nut 6, the latter being internally threaded as shown for adjustment on the arm 2. The arm 2 is formed with an elongated longitudinally extending vertical slot 7 for the reception and movement of the stem 8 of the conventional flush ball 9 which is adapted to seat on the valve seat 10. The nut 6 is formed with a transversely extending opening or passageway 11, this passageway being in alinement at diametrically opposite portions of the nut body structure so that the flush ball stem 8 will have sufficient freedom of movement when in position. It will be noted that the opening 11 formed in the nut is relatively smaller in diameter than the width of the slot 7 in the arm 2, thus permitting a swivel movement of the nut 6 on the arm 2 during periods of rapid operating of the flushing mechanism which inherently causes a lateral motion of the stem 8.

It will be noted that the arm 2 is illustrated with the threads extending about the outer rounded end of the arm structure.

In use the nut 6 is positioned on the threaded arm 2 to aline the flush ball opening with the openings 11 and the ball stem 8 is then extended through the openings 11 of the nut 6, the vertical slot 7 and threaded into the ball. This assembly and alinement of parts requires no tools which are difficult to manipulate within the confined space of a flush tank. When operating the flushing mechanism it will be apparent that the ball stem 8 is free to swing laterally in either direction thus providing substantially a swiveling action and due to the limited threaded area the relative amount of friction is so small this swiveling action is sufficiently free under all circumstances.

What I claim as new and useful and desire to secure by Letters Patent, is:

A guide device for flush ball stems including a clamp ring and a projecting arm, said arm being square in cross section with its corner portions formed with interrupted threads throughout its length, a longitudinally extending closed guide slot formed medially of said arm and defined by vertical side and end walls, a nut having a threaded adjustment on said arm, said nut being formed with transversely extending axially aligned openings for slidably receiving the flush ball stem, whereby the latter may be moved with said nut longitudinally of said arm to the point of its engagement with an end wall of said slot, and said stem being of substantially less diameter than the width of the slot to provide sufficient space between the stem and walls of the slot to permit lateral swinging movement of the stem for seating of the ball.

FRANK J. JOHNSON.

REFERENCES CITED

The following references are of record in the file of this patent:

UNITED STATES PATENTS

| Number | Name | Date |
| --- | --- | --- |
| 1,466,946 | Brunka | Sept. 4, 1923 |
| 1,506,544 | Mick | Aug. 26, 1924 |
| 1,593,833 | Lyons | July 27, 1926 |
| 1,988,934 | Baldwin | Jan. 22, 1935 |